Dec. 13, 1966 W. ULLMANN ETAL 3,292,040
MULTIVIBRATOR PULSE GENERATOR FOR ELECTRO EROSION APPARATUS
Filed Dec. 5, 1960 2 Sheets-Sheet 1

INVENTORS
WERNER ULLMANN
FRITZ GRAUERT

BY *Werner W. Kleeman*
ATTORNEY

Dec. 13, 1966   W. ULLMANN ETAL   3,292,040
MULTIVIBRATOR PULSE GENERATOR FOR ELECTRO EROSION APPARATUS
Filed Dec. 5, 1960   2 Sheets-Sheet 2

INVENTORS
WERNER ULLMANN
FRITZ GRAUERT

BY Werner W. Kleeman
ATTORNEY

United States Patent Office 3,292,040
Patented Dec. 13, 1966

3,292,040
MULTIVIBRATOR PULSE GENERATOR FOR
ELECTRO EROSION APPARATUS
Werner Ullmann and Fritz Grauert, Locarno, Switzerland, assignors to Agie A.G. fur Industrielle Elektronik Locarno, Switzerland, a corporation of Switzerland
Filed Dec. 5, 1960, Ser. No. 73,894
Claims priority, application Switzerland, Dec. 8, 1959, 81,593
3 Claims. (Cl. 315—165)

The present invention relates to a new and improved method and electro-erosion or spark machining apparatus, and to the generation of pulses for carrying out an electro-erosion process by employing new and improved circuitry effectively permitting generation of pulses and control of the frequency, amplitude and duration of the pulse causing spark discharge between a shaped electrode tool and a workpiece electrode.

Electrical discharge in a fluid or liquid dielectric is gaining more and more importance as a method of electro-shaping both in machine tool engineering and for the effective solution of production problems. Important factors of the method under consideration, such as the erosion or material removal efficiency, relative electrode wear, surface quality and the accuracy of reproduction are largely determined by the electric circuitry and characteristics of the pulse generator. A pulse generator is employed to produce non-steady electrical discharges in the gap between a workpiece and electrode tool, which gap is filled with a liquid or gas dielectric. In order to periodically produce current flow across the gap, it is necessary to have a voltage differential across the gap to provide optimum periodic energy absorption at the workpiece electrode with the object of achieving optimum removal of material from the workpiece with minimum possible wear of the electrode.

According to the latest knowledge in the art, a pulse generator for producing spark discharge across the gap must be capable of producing pulses which fulfill the following conditions:

(1) The pulses must be as independent as possible of the geometric properties of the gap, in other words, the shape and size of the gap may at most only exercise a slight or negligible effect on the properties of the pulses.

(2) The shape or configuration, width or duration, and amplitude of the pulses must be capable of variation independently of one another. Preferably it should be possible to generate rectangular shaped pulses.

(3) The polarity of the pulses must be independently adjustable, and it is preferred that such adjustment be continuous from pulses of one polarity to pulses of the opposite polarity, so that the energy absorption at the shaped electrode tool and at the workpiece electrode may be modified.

(4) The width or duration of the pulse must be adjustable independently of the energy of the pulse. The optimum magnitude of the pulse width depends not only on the material forming the workpiece and the electrode tool, but also on the energy of the pulse and the economically permissible reproduction accuracy, so that a wide range of variation is required. Adjustment of the pulse width should, if possible, be continuous in order to enable the relative electrode wear, which is a function of the pulse width, to be controlled as continuously as possible if such control is required.

(5) The frequency of the pulse must be able to be adjusted independent of the width of the pulse.

(6) The pulse energy must be transmitted to the spark gap with the best possible electrical efficiency, small technical expenditure and a high degree of operational reliability.

In one of the most common type of pulse generators heretofore known in the art, a source of direct current voltage is applied through the intermediary of a resistor or an inductor to a charging condenser which is arranged in parallel with the spark gap. Upon starting, the voltage at the charging condenser first rises to the spark-over voltage of the gap to thereby discharge across said gap, whereafter the condenser again charges. It is readily to be appreciated that such a generator will not fulfill the requirements heretofore recited since the pulse frequency, the pulse width and the voltage cannot be independently selected and controlled in pulse generators of this type.

A pulse generator provided with a charging condenser has been proposed wherein a control member is arranged between the charging condenser and the gap so as to enable the duration of the discharge pulses to be limited. Such a generator therefore enables the discharge across the gap to be interrupted before the voltage at the condenser has dropped to a level at which the gap extinguishes by itself. Again, it is not possible for a generator of such construction to meet the requirements noted above since the charging times of the condenser and the discharge characteristics can still not be accurately controlled. It may here further be mentioned that the known generators do not transmit energy to the gap during the times of charging of the condenser. This considerably reduces the total energy transmitted and, accordingly, the volume of material removed.

The electrical pulse generator according to the present invention is provided with a voltage source connected via an electronic switch to the erosion gap, said electronic switch being actuated and controlled by a timer. The invention is characterized by the fact that the electronic switch is connected to both the voltage source and the gap via reactance free impedances, that is impedances having purely resistive properties if line or conductor inductance and capacitances are disregarded or considered negligible.

It has surprisingly been found that current storage control members may be dispensed with in generators of this type without encountering any disadvantages. The control members employed in the present invention are, preferably, controlled semi-conductor elements such as transistors since they possess the necessary small internal resistance and, since they can be controlled largely without inertia and display practically no current storage effect.

It is an important object of the present invention to provide a pulse generator capable of fulfilling the hereinabove mentioned conditions and enables independent adjustment of the width, amplitude and frequencies of the applied pulses.

It is another object of the present invention to provide a pulse generator capable of generating desired pulses irrespective of the properties and physical characteristics of the discharge gap between workpiece and tool electrode.

Another object of the present invention is to provide a pulse generator capable of delivering pulses to a discharge gap, the maximum voltage value of which is not a function of time.

Still a further object of the present invention is to provide a novel circuitry arrangement for a pulse generator which is devoid of inductor or capacitor components arranged in such a manner as to influence the value of the pulse delivered to the erosion gap as a function of time.

Another object of the present invention is to provide a novel circuitry arrangement for a pulse generator including a voltage source for delivering pulses to a discharge gap and an electronic switch in circuit with said voltage source.

Yet a further object of the present invention is to provide a novel pulse generator including a timer controlling the frequency and duration of pulses delivered to a discharge gap.

These and still further objects of the present invention and the entire scope of applicability thereof will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
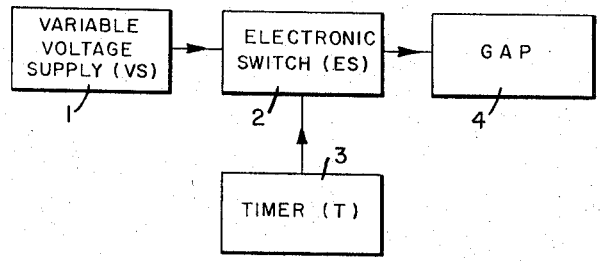
FIG. 1 is a diagrammatic representation of a controlled pulse generator in circuit with spark-erosion or electrical discharge machine tools pursuant to the teachings of the present invention.

Referring now to FIGURE 1 there is diagrammatically illustrated a system for generating pulses across a spark gap defined by a shaping electrode tool and workpiece electrode, and generally indicated by reference numeral 4. The pulse generator assembly generally includes a voltage source 1, electronic switching means 2 in circuit with said voltage source, and a timer 3 for controlling the electronic switching means 2. The voltage source 1 supplies the necessary electric voltage required for the gap 4 and is preferably designed in the form of a power rectifier which delivers a source of D.C. voltage to the gap 4. It is to be understood, however, that this voltage source 1 may also be designed to operate as an A.C. voltage source. The voltage source 1 is of the type wherein the output voltage supplied therefrom can be adjusted, the value of said output voltage constituting the maximum voltage applied across the gap 4 during a given pulse cycle. It is further highly desirable that the voltage source 1 possess small internal resistance so that the voltage drop is as slight as possible when a load is applied. The electric circuit of the voltage source 1 should not possess reactance producing components, either inductive or capacitive, so that the impedance of the circuit is of purely resistive characteristic, assuming that the reactances of the conductors can be neglected. Should capacitive or inductive reactances, that is to say inductors or capacitors, be present in the circuit of the voltage source 1 then undesirable damped oscillations would appear when the load is altered.

The current applied to the gap 4 from the voltage supply source 1 via the electronic switch 2 is periodically and selectively interrupted by a timer 3. The timer 3 which performs the function of controlled the frequency, duration and shape of the applied pulses may be designed, by way of example, as a conventional multivibrator by means of which the aforementioned parameters of said pulses applied across the gap 4 can be adjustably controlled. The timer 3 is preferably designed so that at least the frequency and duration of the pulses may be adjusted independently of one another. Accordingly, no inductors or capacitors which could temporarily alter the magnitude of the applied voltage or current at the gap 4 in any manner, such as a function of time, are connected in circuit between the voltage source 1 and the electronic switch 2, or between said electronic switch and the gap 4. The electronic switch 2 performs the function of interrupting the voltage supplied to the gap 4 by the voltage supplying source 1 in dependance upon the controlled programming of the timer 3.

The components constituting the electronic switch 2 may preferably be formed of controlled semiconductor elements, that is to say, transistors. It is also possible to use gas discharge tubes although they can be used only when working with relatively low pulse frequencies. The gas discharge tubes may be, by way of example, cold cathode tubes, thyratrons and ignitrons. Additionally, high vacuum electron tubes may be equally well employed. Standard switches cannot be considered suitable for this purpose because of the very rapid wear undergone by the contacts at high outputs and the extremely small pulse frequencies useable therewith. The components of the electronic switch 2 should possess a very low internal resistance and at best should only be capable of storing charges of relatively small magnitude.

As already previously noted, a decisive feature of the pulse generator of the present invention is the absence, between the electronic switch 2 and the gap 4 and between the voltage supplying source 1 and the electronic switch 2, of any components which would produce reactances or impedances having non-ohmic characteristics. In other words, the aforementioned portion of the electrical circuitry of the pulse generator system is devoid of any elements such as inductors or capacitors which will influence the applied pulses as a function of time. It has surprisingly been realized that components such as inductors or capacitors which produce reactance characteristics in the generator circuit and which up to the present have always been deemed necessary in the heretofore known generators, not only fail to provide advantages to the electro-erosion process but render controlled performance of such process commensurate with the desired conditions initially detailed entirely impossible. The characteristics of the voltage applied at the gap 4 according to the present invention therefore now is made to depend exclusively on the programming of the timer 3 and not upon a time function of the current due to the use of inductors and/or capacitors as was the case in the devices of the prior art. The total energy transmitted to the gap 4 is therefore larger than that obtainable with any of the generators heretofore employed without, however, presenting the danger of arcing.

Figure 2:
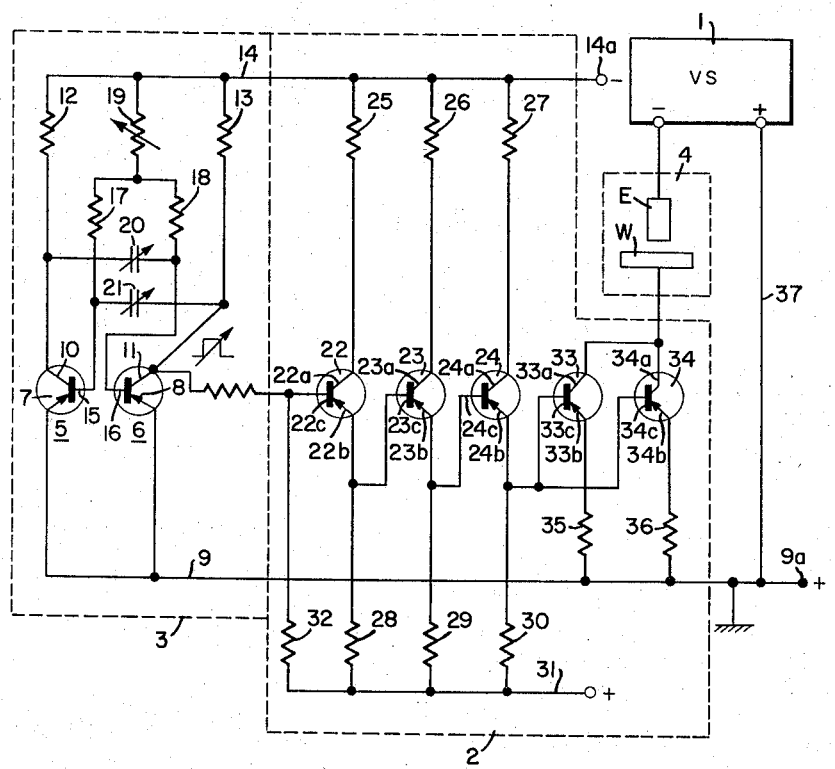
FIG. 2 shows a pulse generator employing a multivibrator as a timer and an electronic switch.

In FIGURE 2 there is shown a circuit diagram of one form of preferred embodiment of a pulse generator for electrical discharge machines pursuant to the teachings of the present invention. In a manner similar to that previously described with reference to FIGURE 1, the pulse generator for supplying pulses to a spark gap 4 is constituted by a voltage supply source 1 in circuit with an electronic switch 2 in turn controlled by a timer 3.

The timer 3 is designed as a conventional multivibrator and comprises two transistors 5 and 6, the emitters 7 and 8 of which are connected via a conductor 9 in circuit at 9a with the positive pole of a suitable supply voltage (not shown). The collectors 10 and 11 of the transistors 5 and 6 are connected through resistors 12 and 13, respectively, to a conductor or line 14 in turn connected at 14a to the negative pole of said supply voltage. The base electrodes 15 and 16 of the transistors 5 and 6 are connected via the resistors 17 and 18, respectively, to a variable resistor 19 also in circuit with the input line or conductor 14. The collector 11 of the transistor 6 is further connected via the variable condenser 21 to the base electrode 15 of the transistor 5, whereas the collector 10 of the transistor 5 is connected to the base electrode 16 of the transistor 6 via a variable condenser 20. It will be appreciated that the timer 3 is constructed as a self-oscillating multivibrator. The variable resistor 19 and the variable condensers 20 and 21 enable an adjustment of both the duration and frequencies of the generated pulses to be carried out. The preferably rectangular outlet pulses emanating from the timer 3 appear, for example, at the collector 11 of the transistor 6.

In the embodiment according to FIGURE 2, the electronic switch 2 consists of a four stage transistor amplifier, the first three stages of which are formed by the transistors 22, 23 and 24 having the collectors 22a, 23a and 24, respectively, connected to the conductor or line 14 through the intermediary of the resistors 25, 26 and 27 respectively. The respective emitters 22b, 23b and 24b and base electrodes 22c, 23c and 24c of each successive transistor stage are connected via resistors 28, 29 and 30 to a supply voltage line 31 maintained at positive potential with respect to the conductor 9. The base electrode 22c of the first transistor 22 is also connected to the voltage line 31 via a resistor 32.

The last stage of the transistor amplifier of FIGURE 2 consists of the two parallelly arranged transistors 33 and 34. The base electrodes 33c and 34c of the transistors 33 and 34, respectively, are connected to the emitter 24b of the transistor 24. The collectors 33a and 34a thereof are connected to the spark gap 4 defined by the electrode tool E and the work piece electrode W, whereas the emitters 33b and 34b are connected via the resistors 35 and 36, respectively, to the conductor 9 which is preferably maintained at ground potential. The voltage supply source 1 for the gap 4 is also connected by means of conductor or line 37 to the conductor 9. Accordingly, the gap 4 is connected to its voltage supply source 1 through the intermediary of the two parallelly arranged transistors 33 and 34. The circuit diagram of FIGURE 2 clearly shows that no inductors or capacitors or reactance producing members having a current storing capacity are employed in those portions of the circuit designated by reference numerals 1, 2 and 4.

Thus, when the timer 3 supplies a predetermined pulse, the transistors 22, 23, 24, 33 and 34 between their respective emitters and collectors become conductive, the controlling current being increased from stage to stage through successive transistors. The last stage of the amplifier which contains the transistor 24 then actuates the two parallelly arranged transistors 33 and 34 which are located directly in the circuit of the gap 4. At the termination of a pulse supplied by the timer 3, the transistors of the electronic switch 2 are successively locked or rendered non-conductive so that the circuit containing the gap 4 is opened. Since no condensers or coils are present in the circuit of the electronic switch 2, control of the applied pulse is performed largely independently of the pulse frequency and is practically inertialless. The amplitude of the pulses delivered to the gap 4 mainly depends upon the setting of the potential level of the adjustable voltage supplied by the main voltage source 1 for the gap 4. The pulse frequency and width or duration can be varied by means of the timer 3 as already previously described.

It will be seen that the pulse generator disclosed enables practically all conditions for successfully carrying out an electro-erosion process to be met since the individual parameters of the pulses applied to the spark gap 4 can be freely selected independently of one another. In particular, the periods or time intervals between two consecutive pulses may be freely selected, said periods are not dependent on the time constant of an RC member and the characteristics of the gap as was the case with conventional generators heretofore known in the art.

Figure 3:
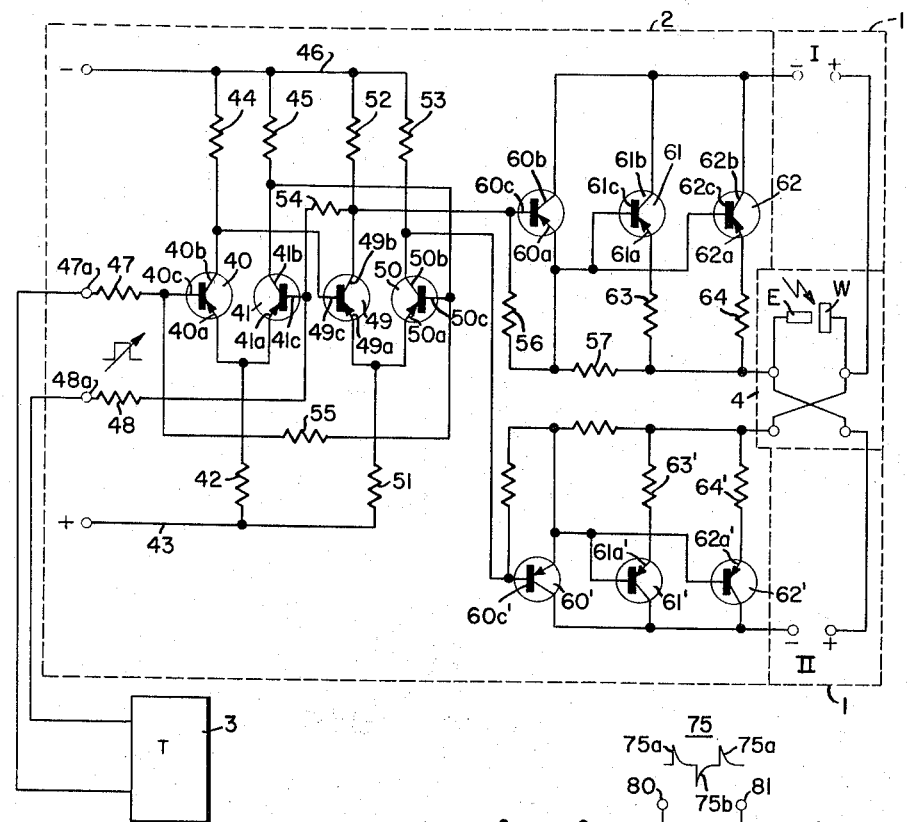
FIG. 3 shows a circuit diagram of a pulse generator employing an electronic switch wherein the polarity of the pulses supplied to the spark gap can be continuously changed.

In the embodiment according to FIGURE 3, the electronic switch 2 is partially constructed as a two stage differential amplifier constituted by the transistors 40, 41 and 49, 50 respectively. The two emitters 40a and 41a of the transistors 40 and 41 are connected with a conductor or lead 43 kept at positive voltage via a resistor 42. The collectors 40b and 41b of these transistors 40 and 41 are each connected via a resistor 44 and 45, respectively, to a conductor 46 kept at negative potential. The base electrodes 40c and 41c thereof are connected to a timer 3 which may be similar to the timer of FIGURE 2 via resistors 47 and 48, respectively, and through the terminals 47a and 48a. If a pulse is supplied to the resistors 47 and 48 there appears between the two collectors 40b and 41b a voltage difference which is proportional to the amplitude of the pulses supplied by the timer 3. This voltage difference is due to the feedback resistor 42 which is connected to the conductor 43 and to both emitters 40a and 41a of the transistors 40 and 41.

Connected in circuit with the collectors 40b and 41b of the transistors 40 and 41 are the base electrodes 49c and 50c, respectively, of the two transistors 49 and 50 which serve to further amplify the voltage difference supplied. The emitters 49a and 50a of the transistors 49 and 50 are connected to the conductor 43 via a common resistor 51, and the collectors 49b and 50b are connected to the conductor 46 via the resistors 52 and 53 respectively. In order to stabilize the amplification, two negative feedback resistors 54 and 55 are provided in a manner known in the art.

The voltage source 1 of FIGURE 3 supplies two independent and adjustable initial voltages I and II. The positive pole of the voltage I is connected to the workpiece W and the positive pole of the voltage II to the tool electrode E. The two negative poles of the two initial voltages I and II are connected via an electronic switching circuit 2, including amplifier means to the tool electrode E and the workpiece W. The electronic switch further includes a pair of two-stage amplifier channels, one of which is connected to the initial voltage I and comprises the transistors 60, 61 and 62. The transistor 60 forms the first stage and the parallelly arranged transistors 61 and 62 form the second stage of the amplifier. The base electrode 60c of the transistor 60 is connected to the collector 49b of the transistor 49 and through a resistor 56 to the emitter 60a. The emitters 61a and 62a of transistors 61 and 62 are connected to the tool electrode E via a resistor 63 and 64 respectively. The collectors 60b, 61b, 61c of the transistors 60, 61 and 62 are connected to the negative pole of the voltage source I. The emitter 60a of transistor 60 is connected to the electrode E via a resistor 57, and to the base electrodes 61c and 62c of the parallel transistors 61 and 62.

The pulses supplied to the collector 49b of the transistor 49 are therefore amplified first by the transistor 60 and subsequently by the parallel transistors 61 and 62. The emitter-collector space of the transistors 61 and 62 therefore connects, in the manner described and via the resistances 63 and 64, the negative pole of the voltage I to the tool electrode E so that the circuit of the voltage I is closed if the two parallel transistors are made conductive by the pulses derived at the emitter 60a.

The other two-stage transistor amplifier channel connecting the negative pole of the voltage II to the workpiece W is identically designed as the previously described channel. It is constituted by the transistors 60', 61' and 62', the emitters 61a' and 62a' completing the circuit via the resistors 63' and 64' respectively. The base electrode 60c' of the transistor 60' is connected to the collector 50b of the transistor 50. The voltages I and II can be separately adjusted so that the voltage appearing at the gap 4 can be freely selected for each polarity.

If a pulse supplied by the timer 3 appears at the resistors 47 and 48, by way of example, a pulse having positive polarity, the transistors 41, 50, 60', 61' and 62 are made conductive so that the voltage II of the polarity previously indicated is supplied to the spark gap 4. On the other hand, if a pulse having negative polarity appears at the resistors 47 and 48, the transistors 40, 49, 60, 61 and 62 become conductive so that the voltage I appears at the spark gap 4, but with the opposite polarity of the voltage II. It can therefore be seen that pulses of the same polarity appear at the spark gap 4 as are present at the resistors 47 and 48. Additionally, it is to be pointed out that no capacitors or inductors are incorporated in the circuit of the voltage source 1 or electronic switch 2 so that the pulses formed, for example, by the timer 3 control the applied pulses across the spark gap 4 so as to be undistorted. Generators of the type described can therefore be employed with pulse frequencies in the magnitude of the operating time of the preferably employed controlled semiconductors.

Figure 4:
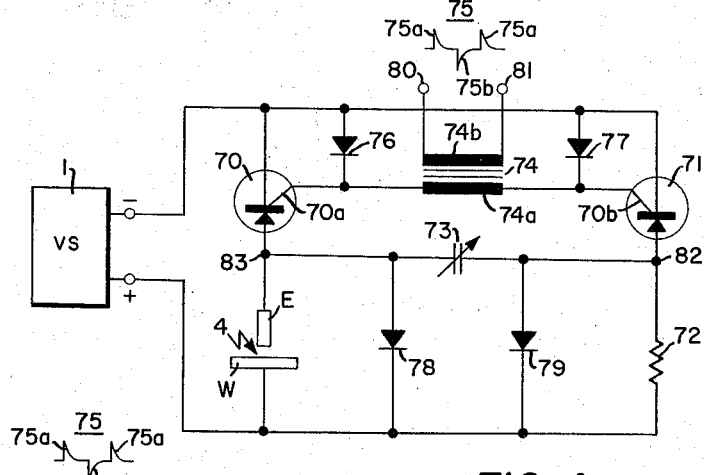
FIG. 4 shows a further embodiment of a pulse generator for spark erosion machines in which controlled semiconductor elements having a thyratron characteristic are employed as the electronic switch.

FIGURE 4 shows a pulse generator having an electronic switch using PNPN semiconductors. Semiconductors of this type may also be designated as controllable rectifiers. They possess a characteristic which approximately corresponds to that of thyratron tubes. If rectifiers of this kind are excited by a control pulse they stay conductive until the anode voltage is briefly interrupted. Rectifiers of this type are commercially available and known in the art.

The pulse generator according to FIGURE 4 is provided with a voltage source 1 which supplies a D.C. voltage of adjustable potential. The circuit incorporating the spark gap 4 and the voltage source 1 contains a controlled rectifier 70 of the type heretofore described. Connected to the negative pole of the voltage source 1 is a further controlled rectifier 71, the one end of which is connected via junction point 82 and a high ohm resistor 72 with the positive pole of the voltage source 1. The ends of the rectifiers 70 and 71 connected with the positive pole of the voltage source 1 via the spark gap 4 and the resistor 72 are interconnected via a variable condenser 73. The control electrodes 70a and 70b of the two controlled rectifiers 70 and 71 are connected to the opposite ends of the secondary winding 74a of a transformer 74, the primary winding 74b of which is connected via the contacts or terminals 80 and 81 to a timer (not shown). The timer supplies the primary winding 74b of the transformer 74 with pulses of the shape diagrammatically illustrated at 75. Arranged between the control electrodes 70a and 70b of the two controlled rectifiers 70 and 71 and the negative pole of the voltage source 1 are diodes 76 and 77 respectively. A separate diode 78 and 79 is arranged parallel with the spark gap 4 and parallel with the high ohm resistor 72 respectively. The timer 3 may be similar to the timer 3 of the previously disclosed embodiments.

In discussing the operation of the pulse generator of FIGURE 4, it is assumed that the spark gap 4 has been connected to the voltage source 1 and is passed by the current by virtue of ignition of the controlled rectifier 70. The subsequent pulse, which is transmitted through the transformer 74 actuates the rectifier 71. Since the two controlled rectifiers 70 and 71 possess a very low internal resistance in the conducting state, the potential of junction point 83, i.e., of the connecting point between the gap 4 and the controlled rectifier 70 is negative and the junction 82 positive. This causes a charging voltage to briefly flow via the variable condenser 73 which in turn results in a drop of potential between the tool electrode E and the rectifier 70. This brief drop in potential suffices to interrupt the voltage flow through the rectifier 70 and to extinguish the spark gap. Only a subsequent pulse supplied by the timer will again render the controlled rectifier 70 conductive, which will then interrupt the voltage flow through the controlled rectifier 71. By way of example, it may be assumed that the positive pulses 75a excite the rectifier 70 while the negative pulses 75b excite the rectifier 71, the latter of which results in deenergization of the rectifier 70. The spark gap 4 will, therefore, be conductive after a pulse 75a and non-conductive after pulse 75b. The spacing of the pulses between 75a and 75b as well as between 75b and 75a therefore determines the times of conductivity of the spark gap 4. The variable condenser 73 does not influence the pulse applied across the gap 4 as the timer 3 solely controls the starting of the rectifiers 70 and 71 respectively.

Figure 5:
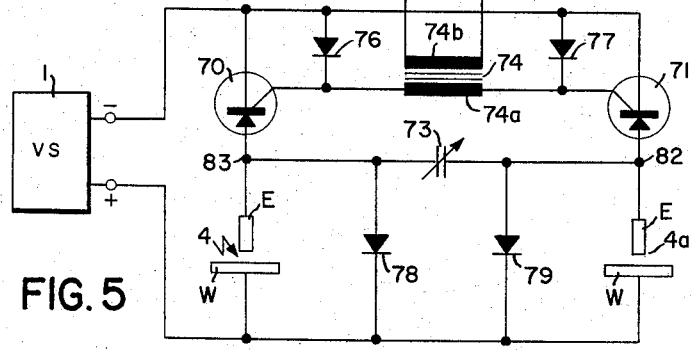
FIGURE 5 illustrates a circuit diagram of a pulse generator similar to FIGURE 4 but provided with two spark gaps.

As in the embodiments previously described, the pulse characteristics are determined solely by the timer and the potential or voltage of the voltage source 1, not by the configuration or dimensions of the gap 4 or by any control elements in the operating circuit such as inductors or capacitors used in known generations. It may here further be noted that the controlled rectifiers 70 and 71 may also be replaced by thyratron or cold cathode tubes. Owing to the rectifying effect of elements 70 and 71, the voltage source 1 may also supply an A.C. voltage. In such a case, however, the pulse amplitude is determined by the alternating voltage. Furthermore, as shown in FIGURE 5 the resistor 72 of FIGURE 4 may be replaced by an additional spark gap 4a so that two spark gaps may be alternately excited.

A number of modifications of the embodiments described are of course possible and are within the spirit and scope of the invention. By way of example, the voltage source 1 may be replaced by an impulse generator of which the impulses are transformed by the electronic switch. The timer may moreover be designed as an impulse forming member which is synchronously controlled by the voltage source.

Having thus described the present invention what is desired to be secured by United States Letters Patent is:

1. The combination with a tool electrode and a workpiece electrode spaced to form a gap for electro-shaping, of an electric pulse generator which comprises adjustable direct current voltage supply means for applying pulse discharges across said gap the amplitude of which can be regulated, electronic switch means connected directly to said gap and coupled to said adjustable direct current voltage supply means, to supply D.C. voltage therefrom directly to said gap and multivibrator timer means for controlling said electronic switch means to independently regulate the frequency and duration of said pulses, said voltage supply means and said electronic switch means being devoid of components, the reactance of which would be sufficient to cause distortion of pulses derived from said timer means and applied across said gap, so that the maximum value of said pulse discharges is not a function of time.

2. An electric pulse generator comprising voltage supply means adapted to apply pulse discharges across a gap, electronic switch means in circuit with said voltage supply means, and timer means for controlling said electronic switch means, said electronic switch means and said voltage supply means including means for producing pulse discharges the maximum value of which is not a function of time, said electronic switch means further including a first controlled rectifier connected to said voltage supply means which is in series with said gap, a second controlled rectifier connected to said voltage supply means, a high ohm resistor in series with said second controlled rectifier, condenser means interconnecting said first and second controlled rectifiers, the respective control electrodes of said first and second controlled rectifiers being connected to said timer means such that ignition of one controlled rectifier will de-energize the other controlled rectifier.

3. An electric pulse generator comprising voltage supply means adapted to apply pulse discharges across two separate gaps, electronic switch means in circuit with said voltage supply means, timer means for controlling said electronic switch means, said electronic switch means and said voltage supply means including means for producing pulse discharge the maximum value of which is not a function of time, a separate controlled rectifier connected to said voltage supply means each adapted to be connected in circuit with a separate gap, said controlled rectifiers being interconnected by a condenser with the respective control electrodes of said separate controlled rectifiers in circuit with said timer means, whereby ignition of one of said controlled rectifiers interrupts current flow through the other of said controlled rectifiers such that the two gaps are alternately supplied with pulse discharges.

References Cited by the Examiner

UNITED STATES PATENTS

| | | | |
|---|---|---|---|
| 2,794,109 | 5/1957 | Martin | 315—227.1 |
| 2,871,410 | 1/1959 | Matulaitis | 315—227.1 |
| 2,891,195 | 6/1959 | Smythe | 307—88.5 |
| 2,939,065 | 5/1960 | Matulaitis | 219—69 X |
| 2,951,930 | 9/1960 | McKechnie | 315—227.1 |
| 2,951,969 | 9/1960 | Matulaitis | 315—163 |
| 3,018,411 | 1/1962 | Webb | 315—227.1 |

OTHER REFERENCES

"Notes on the Application of the Silicon Controlled Rectifier," p. 52, EGG-371-1 Application Engineering, Semiconductor Products Department, General Electric Co., Syracuse, N.Y., December 1958.

"Principles of Transistor Circuits" by Richard F. Shea, John Wiley and Sons, New York, N.Y., Sept. 9, 1953, pp. 19, 20, 184, 185.

JAMES W. LAWRENCE, *Primary Examiner.*

RALPH G. NILSON, BENNETT G. MILLER, GEORGE N. WESTBY, *Examiners.*

C. R. CAMPBELL, *Assistant Examiner.*